United States Patent [19]

Taylor et al.

[11] 3,868,244
[45] Feb. 25, 1975

[54] PLANT GROWTH REGULATION

[75] Inventors: Harold M. Taylor; James D. Davenport, both of Indianapolis; Ronald E. Hackler, Greenfield, all of Ind.

[73] Assignee: Eli Lilly and Company, Indianapolis, Ind.

[22] Filed: Jan. 30, 1974

[21] Appl. No.: 438,110

Related U.S. Application Data

[63] Continuation-in-part of Ser. No. 234,338, March 13, 1972, abandoned, which is a continuation-in-part of Ser. No. 888,949, Dec. 29, 1969, abandoned, which is a continuation-in-part of Ser. No. 829,844, May 7, 1969, abandoned, which is a continuation-in-part of Ser. No. 685,315, Nov. 24, 1967, abandoned, which is a continuation-in-part of Ser. No. 634,074, April 27, 1967, abandoned.

[52] U.S. Cl............................... 71/76, 71/90, 71/92
[51] Int. Cl................................................ A01n 9/22
[58] Field of Search........................... 71/92, 76, 90

[56] References Cited
OTHER PUBLICATIONS

Zavenyagina et al., I Chem. Abst. Vol. 70 (1969), 114052U.
Zavenyagina et al., II Chem. Abst. Vol. 70 (1969), 9393b.

Primary Examiner—Lewis Gotts
Assistant Examiner—Catherine L. Mills
Attorney, Agent, or Firm—Joseph A. Jones; Everet F. Smith

[57] ABSTRACT

There is disclosed a class of $\alpha,\alpha$-disubstituted-5-pyrimidinemethanes and substituted methanes which are useful as plant growth regulators. Internodal elongation of plants is inhibited by treatment with a compound of this invention.

29 Claims, No Drawings

PLANT GROWTH REGULATION

CROSS REFERENCE

This application is a continuation-in-part of our co-pending application Ser. No. 234,338, filed Mar. 13, 1972 now abandoned, which was a continuation-in-part of our then copending application Ser. No. 888,949, filed Dec. 29, 1969, now abandoned, which was a continuation-in-part of our then co-pending application Ser. No. 829,844, filed May 7, 1969, now abandoned, which was a continuation-in-part of our then co-pending application Ser. No. 685,315, filed Nov. 24, 1967, now abandoned, which was a continuation-in-part of our then co-pending application Ser. No. 634,074, filed Apr. 27, 1967, and now abandoned.

BACKGROUND OF THE INVENTION

Treatment of plants with agents which inhibit internodal elongation, thereby reducing stem length, is frequently beneficial. The modified plant is often more attractive, more fruitful, and stronger than is the untreated plant. Treatment of undesirable plants, such as aquatic weeds, with such agents reduces the biomass of the annoying weeds.

In the prior art, Margot et al., U.S. Pat. No. 2,839,446 (June 17, 1958) teach novel pyrimidines which are said to possess fungicidal activity. The Margot compounds are distinguished by having at least one trichloromethane sulphenylmercapto group preferably attached at the 2-position of the pyrimidine ring.

In addition, Ballard et al., U.S. Pat. No. 2,658,895 (Nov. 10, 1953), teach 2-alkylphenyl-3,4,5,6-tetrahydropyrimidines which are said to have fungicidal and detergent properties and also to have use as asphalt additives.

Schellenberger et al., Angew. Chem. 76 (5), 226–7 (1964), teach the use of 2-methyl-5-hydroxymethyl-pyrimidine as an intermediate in the synthesis of a co-carboxylase inhibitor. This compound lacks R and R' substituents in the generic formula shown below, and, in our tests, has been found to be inactive.

Brederick et al., Chem. Ber., 93, 230–35 (1960), teach the preparation of 5-isopropylpyrimidine and 5-isoheptylpyrimidine, respectively. No utility is disclosed therefor.

Lewin et al., Arch. Biochem and Biophysics, 101, 197–203 (1963), teach the use of 5-hydroxymethyl-pyrimidine as a substrate in studying the in vivo inhibition of thiamine synthesis.

Some workers in the prior art have shown plant growth regulating and herbicidal activity of pyrimidine compounds. Such workers include Phillips, U.S. Pat. No. 3,702,361, and Gysin, Canadian Pat. No. 610,487.

Other workers have disclosed that other compounds based on diazine rings have plant growth regulating activity. For example, Gysin mentioned above, Hoffmann, Canadian Pat. No. 507,164, Tamura, U.S. Pat. No. 3,427,146, and Geronimo, U.S. Pat. No. 3,539,332 have shown such activity of diazine compounds.

SUMMARY

We have now discovered a class of novel 5-substituted pyrimidines which are effective plant growth regulators. Internodal elongation of terrestrial and aquatic plants is inhibited by treatment with a 5-substituted pyrimidine of this invention at rates of about 0.1 to 10 pounds per acre, or about 0.1 to 10 parts per million parts of growth medium. Such treatment does not injure the plants.

DESCRIPTION OF THE PREFERRED EMBODIMENT

Our novel 5-substituted pyrimidines are compounds of the formula

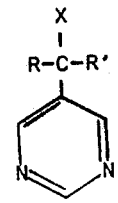

wherein
X is hydrogen, hydroxy, $N(R'')_2$, $C_1$–$C_3$ alkoxy, halo, cyano, anilino, or imidazolylthio;
R is $C_2$–$C_{11}$ alkyl, $C_2$–$C_{11}$ alkenyl,

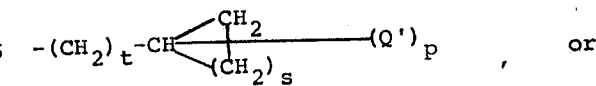 or

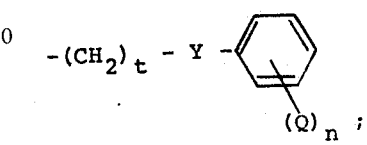

R' is $C_3$–$C_{11}$ alkyl, $C_2$–$C_{11}$ alkenyl, norbornen-2-yl, 2-norbornyl, adamantyl,

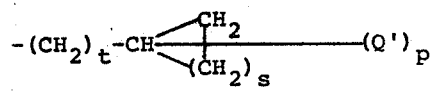

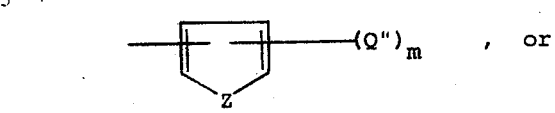 or

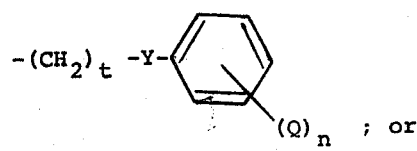 ; or when
X is hydrogen or hydroxy, R and R' taken together with the carbon atom to which they are attached form a ring of the formula

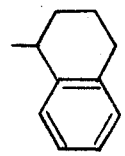

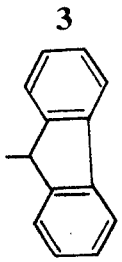

, or

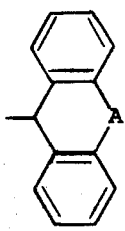

;

Q is $C_1-C_4$ alkyl, $C_1-C_4$ alkoxy, $C_1-C_4$ alkylthio, halo, hydroxy, trifluoromethyl, $C_1-C_4$ alkylsulfonyl, nitro, or di($C_1-C_4$ alkyl)amino, or two Q's attached to adjacent carbon atoms of a benzene ring form a methylenedioxy group;

Q' is $C_1-C_4$ alkyl or methoxy:

Q'' is $C_1-C_4$ alkyl;

Y is oxygen, sulfur, or a carbon to carbon bond;

Z is oxygen or sulfur;

A is oxygen, sulfur, $CH_2$, or $CH_2-CH_2$;

R'' is hydrogen or $C_1-C_4$ alkyl;

$n$ is 0 to 5;

$m$ is 0 to 2;

$p$ is 0 to 3;

$s$ is 1 to 6; and $t$ is 0 to 5, and the nonphytotoxic acid addition salts thereof.

The various alkyl groups are saturated straight or branched-chain aliphatic hydrocarbon radicals such as, for example, methyl, ethyl, n-propyl, isopropyl, n-butyl, sec.-butyl, tert.-butyl, n-amyl, isoamyl, sec.-amyl, tertiary amyl and other isomeric amyl, n-hexyl, isohexyl, sec.-hexyl, and other isomeric hexyl, n-heptyl, and other isomeric heptyls, n-octyl, isooctyl, and other isomeric octyls, n-primary nonyl (nonyl-1), nonyl-2, nonyl-3, nonyl-4, 2-methyloctyl-2, 4-ethylheptyl-4, 3-methyl-4-ethyl-hexyl-4, 3-methyl-3-ethyl-pentyl-3, 2-ethyl-hexyl-1, n-primary decyl (decyl-1), decyl-4, 2-ethyloctyl-3(tertiary decyl), undecyl, and the like.

Illustrative alkoxy groups are methoxy, ethoxy, propoxy, isopropoxy, n-butoxy, and isobutoxy.

Illustrative alkylthio groups are methylthio, ethylthio, n-propylthio, isopropylthio, and n-butylthio.

Halo includes bromo, chloro, fluoro and iodo.

Each of R and R' may be cycloalkyl groups containing from three to eight carbon atoms, optionally substituted with from one to three $C_1-C_4$ alkyl or methoxy groups. These groups can be attached directly to the α-carbon atom of the pyrimidinemethane or may be attracted through from one to five methylene groups.

Each of R and R' may also be phenyl, phenoxy, or phenylthio or substituted phenyl, phenoxy, or phenylthio attached directly to the α-carbon or through 1 to 5 methylene groups. In addition, one of them may be furyl, substituted furyl, thienyl or substituted thienyl.

Suitable $C_2-C_{11}$ alkenyl groups include vinyl, allyl, 1-butenyl, 3-pentenyl, 1-hexenyl, 4-octenyl, 3-decenyl, 5-undecenyl, and the like.

It should be noted that only when X is hydrogen is there a hydrogen attached to the α-carbon atom of out 5-pyrimidinemethanes. There are never two hydrogens attached to this α-carbon atom. Thus, compounds wherein R and/or R' are hydrogen are outside the scope of the our invention. We have found such compounds, for example the 2-methyl-5-hydroxymethyl-pyrimidine of Schellenberger et al., to lack the activity of the compounds of our invention.

Suitable nonphytotoxic acid addition salts of the bases represented by the above formula can be prepared employing those acids of sufficient acidity to form acid addition salts with the weakly basic pyrimidine group or with an amine substituent attached thereto. These include, inter alia, hydrobromic, sulfuric, phosphoric, picric, nitric, oxalic, methanesulfonic, hydrochloric, hydriodic, benzenesulfonic, p-toluenesulfonic, maleic, and the like.

The 5-substituted pyrimidinemethanols (X is OH in the generic formula, supra) are readily prepared in good yields by a synthesis exemplified as follows: A suitable ketone, for example, benzoylcyclohexane, is dissolved in a solvent composed of equal volumes of tetrahydrofuran and ethyl ether. The solution is cooled to −120°C., and while maintained at that temperature, a solution of 5-bromopyrimidine in equal volumes of tetrahydrofuran and ethyl ether is added thereto. While the mixture is maintained at about −120°C., a hexane solution of n-butyllithium is added. The reaction mixture is stirred overnight in the cold, the reaction product mixture washed successively with dilute aqueous ammonium chloride solution and water, and the organic layer separated and dried over a suitable drying agent. The dried organic layer is concentrated to dryness in vacuo and the solid residue extracted with ether to remove undesired by-products. The ether-insoluble material remaining is identified by elemental analysis as α-cyclohexyl-α-phenyl-5-pyrimidinemethanol.

An alternative method appears preferable in some instances and proceeds as follows: In a suitable reaction flask, dry ether is maintained in an atmosphere of dry nitrogen, cooled to about −118°C., and a solution of butyllithium in hexane added, followed by a solution of 5-bromopyrimidine in tetrahydrofuran. The reaction mixture is cooled to about −120°C. and a solution of a suitable ketone, for example, 4-fluorobenzophenone, in tetrahydrofuran is added at such a rate as to maintain the temperature of the reaction mixture at −120°C. The reaction product mixture is stirred overnight and warmed gradually to room temperature. The mixture is neutralized with saturated aqueous ammonium chloride solution and extracted with ether. The combined ether extracts are dried, concentrated to dryness in vacuo and the residual material dissolved in benzene and chromatographed over a silica gel column, eluting with a mixture of ethyl acetate-benzene. The product obtained fromm the fraction eluted with 30:50 ethyl acetate-benzene is recrystallized from a solvent such as ether and identified as α-(4-fluorophenyl)-α-phenyl-5-pyrimidinemethanol.

When X is H in the generic formula, supra, some of the compounds can be prepared according to the procedure of Sperber et al., U.S. Pat. No. 2,727,895 (Dec. 20, 1955) whereby the 5-substituted pyrimidinemethanol (prepared as above) is heated in a mixture of glacial acetic acid and 47 percent aqueous hydriodic acid to reduce the hydroxyl group and yield the 5-substituted pyrimidinemethane.

In other compounds where X is H, the preparation is accomplished by the reaction of a suitably substituted malonic ester with urea or formamidine, or the like. For example: A mixture of diethyl 4-methylbenzhydryl malonate and urea is allowed to react in an anhydrous alcohol such as methanol in the presence of sodium methylate to yield 2,4,6-trihydroxy-5-(4-methylbenzhydryl)pyrimidine. This trihydroxy compound is allowed to react with excess phosphorous oxychloride to yield 2,4,6-trichloro-5-(4-methylbenzhydryl)pyrimidine. The trichloropyrimidine is then hydrogenated in the presence of triethylamine and palladinized charcoal to yield 5-(4-methylbenzhydryl)pyrimidine.

Where X is cyano in the above generic formula, the compound can be prepared in the following manner:
A mixture of diphenylacetonitrile and 5-bromopyrimidine is allowed to react in the presence of potassium amide in a suitable solvent such as xylene to yield α,α-diphenyl-5-pyrimidineacetonitrile.

Those compounds where X is $C_1-C_3$ alkoxy are prepared by allowing an alkali-metal lower alkoxide such as sodium methoxide, potassium ethoxide, or sodium propoxide to react in alkanol soltuion with an α-halo analogue of the desired product [e.g., 5-(α-chlorodiphenylmethyl)pyrimidine] to yield the desired product [e.g., 5-(α-$C_1-C_3$ alkoxydiphenylmethyl)pyrimidine].

Where X is amino, the compounds are prepared by heating a mixture of the analogous halo-substituted pyrimidine, such as 5-(α-chlorodiphenylmethyl)pyrimidine, and excess liquid ammonia at an elevated temperature of about 100°C. in a sealed stainless steel reaction vessel for a time sufficient to complete the reaction. The product can be isolated as the free base 5-(α-aminodiphenylmethyl)pyrimidine, or in the form of a salt such as the hydrochloride, hydrobromide, or the like.

Following the same general procedure, the 5-[α-(2-imidazolylthio)diphenylmethyl]pyrimidine is readily synthesized by allowing 2-mercaptoimidazole to react with 5-(α-chlorodiphenylmethyl)pyrimidine in the presence of a base such as sodium or potassium ethoxide in a suitable solvent such as absolute ethanol. The reaction product mixture is concentrated to dryness at reduced pressure and the solid residue slurried or extracted with a solvent such as hot benzene or dissolve the product, 5-[α-(2-imidazolylthio)diphenylmethyl]pyrimidine, which then crystallizes from the benzene.

Where X is anilino, the compounds are readily prepared by heating an α-halo analogue such as 5-(α-chlorodiphenylmethyl)pyrimidine with aniline in an inert solvent such as benzene on the steam bath for a time sufficient to complete the reaction. The aniline hydrochloride which precipitates is filtered off, the filtrate concentrated in vacuo to dryness, and the residue recrystallized from a suitable solvent such as ethyl ether to yield 5-(α,60-diphenyl-α-anilinomethyl)pyrimidine.

The following examples describe in detail the methods used in preparing the compounds of this invention. However, the invention is not to be construed as limited thereby either in spirit or in scope, since it will be apparent to those skilled in the art that many modifications both of materials and methods may be practiced within the purpose and intent of this disclosure.

EXAMPLE 1

α-Cyclohexyl-α-phenyl- 5-pyrimidinemethanol

To a solution of 0.1 mole of benzoylcyclohexane in 250 ml. of a mixture of equal volumes of tetrahydrofuran and ether and cooled to −120°C. was added a solution of 0.1 mole of 5-bromopyrimidine in the same mixed solvent. The mixture was stirred and maintained at about −120°C. in a cooling bath composed of liquid nitrogen and ethanol, and to the cooled solution were added 60 ml. of a 15 percent solution of n-butyllithium in n-hexane, and the reaction mixture was stirred overnight.

The reaction product mixture was washed successively with 10 percent aqueous ammonium chloride solution and water and dried over anhydrous potassium carbonate. The dried organic solution was evaporated to dryness to yield a solid weighing about 14 g. The solid was extracted with ether and the undissolved solid washed twice with ether. The ether-insoluble material was identified as α-cyclohexyl-α-phenyl-5-pyrimidinemethanol having a melting point of about 156°–157°C.

Following the general procedure of Example 1, with appropriate starting materials, the following compounds were prepared and isolated as free bases or acid addition salts thereof:

α,α-Bis(4-chlorophenyl)-5-pyrimidinemethanol. Melting point: Glass.

α-Phenyl-α-(4-chlorophenyl)-5-pyrimidinemethanol hydrochloride. Melting point: Glass.

α,α-Bis(cyclohexyl)-5-pyrimidinemethanol. Melting point: 142°–144°C.

α,α-Bis(n-hexyl)-5-pyrimidinemethanol. Melting point: Viscous liquid.

α,α-Bis(3-fluorophenyl)-5-pyrimidinemethanol. Melting point: Glass.

α-(2-Chlorophenyl)-α-(3-chloropheny)-5-pyrimidinemethanol. Melting point: Glass.

α-(2-Chlorophenyl)-α-(4-fluorophenyl)-5-pyrimidinemethanol. Melting point: 66°C.

α-(2-Chlorophenyl)-α-cyclohexyl-5-pyrimidinemethanol. Melting point: 65°C.

α,α-Diphenyl-5-pyrimidinemethanol. Mething point: 167°–170°C.

α-(2-Chlorophenyl)-α-phenyl-5-pyrimidinemethanol. Melting point: 154°–156°C.

α-(n-Pentyl)-α-phenyl-5-pyrimidinemethanol. Melting point: Liquid.

α-(2-Fluorophenyl)-α-phenyl-5-pyrimidinemethaol. Melting point: 139°–141°C.

α,α-Bis(3,4-dichlorophenyl)-5-pyrimidinemethanol hemietherate. Melting point: 88°–89°C.

α-(Phenyl)α-(2-thienyl)-5-pyrimidinemethanol. Melting point: 140°–142°C.

α,α-Bis(isopropyl)-5-pyrimidinemethanol. Melting point: 115°–118°C.

α-(4-Ethoxyphenyl)-α-isopropyl-5-pyrimidinemethanol. Melting point: 89°C.

α-Cyclopropyl-α-(4-methoxyphenyl)-5-pyrimidinemethanol. Melting point: 111°C.

α-(4-Chlorophenyl)-α-isopropyl-5-pyrimidinemethanol. Melting point: 129°C.

α-(t-Butyl)-α-(4methoxyphenyl)-5-pyrimidinemethanol. Melting point: 117°C.

α-(p-Cumenyl)α-isopropyl-5-pyrimidinemethanol. Melting point: 98°C.

α-(3,4-Dichlorophenyl)-α-isopropyl-5-pyrimidinemethanol. Melting point: 127°C.

α-Cyclohexyl-α-cyclopropyl-5-pyrimidinemethanol. Melting point: 113°–114°C.

α-(3-Chlorophenyl)-α-isopropyl-5-pyrimidinementhanol. Melting point: 95°C.

α-Cyclopropyl-α-(p-cumenyl)-5-pyrimidinemethanol. Melting point: 104°C.

α-Cyclohexyl-α-isopropyl-5-pyrimidinemethanol. Melting point: oil.

α,α-Bis(n-nonyl)-5-pyrimidinemethanol. Melting point: oil.

α-(2,5-Dichlorophenyl)-α-cyclohexyl-5-pyrimidinemethanol. Melting point: 136°C.

α-(2Chlorophenyl)-α-cyclohexyl-5-pyrimidinemethanol. Melting point: 65°C.

α-(2-Chlorophenyl)-α-(4-methoxyphenyl)-5-pyrimidinemethanol. Melting point: Glass.

α-Cyclohexyl-α-(2-methoxyphenyl)-5-pyrimidinemethanol. Melting point: 114°–115°C.

α-Cyclohexyl-α-phenyl-5-pyrimidinemethanol. Melting point: 156°–157°C.

α-Cyclohexyl-α-(2-fluorophenyl)-5-pyrimidinemethanol. Melting point: 140°–142°C.

α-Cyclohexyl-α-pentafluorophenyl-5-pyrimidinemethanol. Melting point: 140°–150°C.

α,α-Bis(2-chlorophenyl)-5-pyrimidinemethanol. Melting point: 132°–133°C.

α-(α,α,α-Trifluoro-m-tolyl)-α-isopropyl-5-pyrimidinemethanol. Melting point: 97°C.

α-(α,α,α-Trifluoro-p-tolyl)-α-isopropyl-5-pyrimidinemethanol. Melting point: 113°C.

α-Isopropyl-α-(4-propoxyphenyl)-5-pyrimidinemethanol. Melting point: 80°C.

α-Cyclopropyl-α-(p-tolyl)-5-pyrimidinemethanol. Melting point: 128°C.

α-(4-Bromophenyl)-α-cyclopropyl-5-pyrimidinemethanol. Melting point: 123°C.

α-(2-Fluorophenyl)-α-(4-fluorophenyl)-5-pyrimidinemethanol. Melting point: 130°C.

α-(t-Butyl)α-(p-tolyl)-5-pyrimidinemethanol. Melting point: 155°C.

α-Cyclopropyl-α-(4-fluorophenyl)-5-pyrimidinemethanol. Melting point: 73°–74°C.

α-Isopropyl-α-(4-methoxyphenyl)-5-pyrimidinemethanol. Melting point: 148°C.

α-(4-Chlorophenyl)-α-cyclopropyl-5-pyrimidinemethanol. Melting point: 112°–113°C.

α-(4-Methoxyphenyl)-α-phenyl-5-pyrimidinemethanol. Melting point: 95°–97°C.

α-(2,4-Difluorophenyl)-α-phenyl-5-pyrimidinemethanol. Melting point: 120°–121°C.

α-(2,5-Dichlorophenyl)-α-phenyl-5-pyrimidinemethanol. Melting point: 134°–136°C.

α-(4-Chlorophenyl)-α-isopropyl-5-pyrimidinemethanol Melting point: 129°C.

α-Cyclobutyl-α-phenyl-5-pyrimidinemethanol. Melting point: 115°–117°C.

α-(3,4-Dichlorophenyl)-α-phenyl-5-pyrimidinemethanol. Melting point: Glass.

α-(2,4-Dichlorophenyl)-α-phenyl-5-pyrimidinemethanol. Melting point: 96°–97°C.

α-(4-Nitrophenyl)-α-phenyl-5-pyrimidinemethanol. Melting point: Glass.

α-(2-Fluorophenyl)-α-(3-fluorophenyl)-5-pyrimidinemethanol. Melting point: 104°–108°C.

α,α-Bis(p-tolyl)5-pyrimidinemethanol. Melting point: Glass.

α-(2,4-Dimethylphenyl)-α-phenyl-5-pyrimidinemethanol. Melting point: Glass.

α-Phenyl-α-(p-anisyl)-5-pyrimidinemethanol. Melting point: 95°–97°C.

α-(4-Chlorophenyl)-α-(4-phenoxy-n-butly)-5-pyrimidinemethanol. Viscous oil. Identified by N.M.R. spectrum and elemental analyses.

α-(5-Norbornen-2-yl)-α-phenyl-5-pyrimidinemethanol. Melting point: 137°C.

α,α-Bis[2-(4-methylcyclohexyl)ethyl]-5-pyrimidinemethanol. Viscous oil. Identified by N.M.R. spectrum and elemental analyses.

α-Phenyl-α-(3-phenyl-n-propyl)-5-pyrimidinemethanol. Viscous oil. Identified by N.M.R. and elemental analyses.

α-(4-Phenoxybutly)-α-(2-norbornyl)-5-pyrimidinemethanol. Melting point: 132°C.

α-(4-Chlorophenyl)-α-(2-norbornyl)-5-pyrimidinemethanol. Melting point: 193°C.

α-(1-Pentenyl)-α-phenyl-5-pyrimidinemethanol. Viscous oil. Identified by N.M.R. spectrum.

α-(3-Pentenyl)-α-phenyl-5-pyrimidinemethanol. Glass. Identified by N.M.R. spectrum.

α-Phenyl-α-(4-trifluoromethylphenyl)-5-pyrimidinemethanol. Melting point: 125°–127°C.

α-Cyclobutyl-α-(4-methoxyphenyl)-5-pyrimidinemethanol. Melting point: 148°C.

EXAMPLE 2

5-Bis(4-chlorophenyl)-methylpyrimidine

A mixture of 6 g. of a α,α-bis(4-chlorophenyl)-5-pyrimidinemethanol, 200 ml. of glacial acetic acid, and 10 ml. of 47 percent hydriodic acid was refluxed for 40 minutes, poured into water, and the aqueous mixture extracted several times with ether. The combined ether layer were washed successively with water, 5 percent aqueous sodium bicarbonate solution, and water, dried over anhydrous magnesium sulfate, and evaporated in vacuo to dryness. The residue was extracted with petroleum ether and the extracts concentrated. The product was obtained as a thick reddish oil identified by infrared and nuclear magnetic resonance spectra as 5-bis(4-chlorophenyl)methylpyrimidine.

Following the same general procedure as in Example 2, with appropriate starting materials, the following compounds were prepared: 5-(2-Fluorodiphenylmethyl)pyrimidine. Melting point: Viscous oil.

5-Diphenylmethylpyrimidine. Melting point: 83°C.

5-(α-Isopropyl-4-methoxybenzyl)pyrimidine. Melting point: 67°–69°C.

5-[Bis(3,4-dichlorophenyl)methyl]pyrimidine. Melting point: Viscous oil.

EXAMPLE 3

α,α-Diphenyl-5-pyrimidineacetonitrile

To 0.1 mole of potassium amide in liquid ammonia was added a soultion of 0.1 mole of diphenylacetonitrile in 300 ml. of xylene, and the mixture was heated to refluxing for about 30 minutes to remove excess ammonia. To the xylene solution was added a solution of 0.1 mole of 5-bromopyrimidine in 100 ml. of xylene and the mixture stirred for about 20 minutes. To the mixture were then added 20 ml. of dimethylformamide and the mixture was refluxed for about 1 hour. The reaction product mixture was cooled in an ice bath and extracted with ether. The ether solution was evaporated to dryness, the residue dissolved in benzene and chromatographed on an alumina column, elution being carried out with ethyl acetate. The eluate was concentrated to yield α,α-diphenyl-5-pyrimidineacetonitrile as a solid having a melting point of about 98°–100°C., identified by N.M.R. spectrum and elemental analysis.

EXAMPLE 4

2,4,6-Trichloro-5-(4-methylbenzhydryl)pyrimidine

To a solution of 22 g. (0.95 g.-atom) of sodium in 500 ml. absolute ethanol was added a solution of 33 g. (0.55 mole) of urea and 95 g. (0.28 mole) of diethyl 4-methylbenzhydryl malonate in 500 ml. of absolute ethanol, and the mixture was refluxed for about 2 hours. The reaction product mixture was cooled and diluted with about 1000 ml. of water and 500 ml. of ether. The layers were separated. The aqueous layer was washed with about 200 ml. of ether. The ether washings were combined with the original organic layer and washed with 200 ml. water. The washed aqueous layer and the water washings were combined and acidified with concentrated aqueous hydrochloric acid. An oily layer separated which solidified under vacuum. The crude solid was dissolved in dilute aqueous sodium hydroxide and the basic solution acidified with acetic acid. The solid which separated was recrystallized from acetic acid to yield a crystalline solid having a melting point of about 115°C. and identified by N.M.R. spectrum as 5-(4-methylbenzhydryl)barbituric acid. Weight: 45 g.

A mixture of 39 g. (0.13 mole) of 5-(4-methylbenzhydryl)barbituric acid (prepared above), 116 g. (0.76 mole) of phosphorus oxychloride, and 56 g. (0.38 mole) of N,N-diethylaniline was heated at reflux temperature for about 6 hours. The reaction product mixture was cooled, diluted with a mixture of crushed ice and water, and allowed to stand for about an hour. The mixture was extracted 5 times with 300 ml. of ether, the combined extracts were dried and the solvent was evaporated to dryness of the steam bath. The residue remaining was extracted with hot petroleum ether. (b.p. = 60°–70°C.). The petroleum ether solution was cooled, and a crystalline product separated which had a melting point of about 112°–113°C. and weighed about 30 g. It was identified by N.M.R. spectrum and elemental analysis as 2,4,6-trichloro-5-(4-methylbenzhydryl)pyrimidine.

Following the general procedure of Example 4, with appropriate starting materials, other compounds were prepared and are listed as follows:

2,4,6-Trichloro-5 -(benzhydryl)pyrimidine. Melting point: 105°–106°C.

2,4,6-Trichloro-5-(4-methoxybenzhydryl)pyrimidine. Melting point: 129°–131°C.

2,4,6-Trichloro-5-(2-chlorobenzhydryl)pyrimidine. Melting point: 162°–163°C.

2.4.6-Trichloro-5-(1-phenyl-n-heptyl)pyrimidine. Melting point: Oil.

2,4,6-Trichloro-5-(1-phenyl-n-butyl)pyrimidine. Melting point: 72°C.

EXAMPLE 5

5-(4-Methylbenzhydryl)pyrimidine

A mixture of 15 g. (0.041 mole) of 2,4,6,-trichloro-5-methylbenzhydryl)pyrimidine, 12.5 g. (0.124 mole) triethylamine, 100 ml. dry dioxane, and 1 g. of 5 percent palladinized charcoal was hydrogenated on a Paar shaker at an initial pressure of 15 p.s.i. for about 5 hours, during which time the theoretical amount of hydrogen was absorbed. When the hydrogenation was complete, the reaction product mixture was concentrated in vacuo to dryness. The residue was dissolved in benzene and chromatographed on the alumina column, eluting with ethyl acetate. A solid was obtained which was recrystallized from petroleum ether to yield crystalline material having a melting point of about 71°–72°C., and identified by N.M.R. spectrum and elemental analysis as 5-(4-methylbenzhydryl)pyrimidine. Weight: 8 g.

Following the general procedure of Example 5 with appropriate starting materials, other compounds were prepared and are listed as follows:

5-(Benzhydryl)pyrimidine. Melting point: 83°C.

5-(4-Methoxybenzhydryl)pyrimidine. Melting point: Oil.

5-(2-Chlorobenzhydryl)pyrimidine. Melting point: 107°–108°C.

5-(1-phenyl-n-heptyl)pyrimidine. Melting point: Oil.

5-(1Phenyl-n-butyl)pyrimidine. Melting point: Oil.

EXAMPLE 6

5-(α-Chlorodiphenylmethyl)pyrimidine

To a refluxing solution of 40 g. of α,α-diphenyl-5-pyrimidinemethanol in 200 ml. of xylene was added anhydrous hydrogen chloride gas via a bubbler tube, and the by-product water was collected in a Dean-Stark trap. The reaction product mixture was concentrated in vacuo to dryness. The dry residue was washed with ethyl either to remove starting material, and the ethyl ether-insoluble residue was dissolved in hot petroleum ether. The petroleum ether was evaporated to dryness and the residue recrystallized from ether to yield solid product weighing 6 g. and having a melting point of about 92°–94°C. The product was identified as 5-(α-chlorodiphenylmethyl)pyrimidine by elemental analysis and N.M.R. spectrum.

EXAMPLE 7

5-(α,α-Diphenyl-α-anilinomethyl)pyrimidine

A mixture of 5 g. of 5-(α-chlorodiphenylmethyl)-pyrimidine, 10 ml. of aniline, and 40 ml. of benzene was warmed for about an hour on the steam bath. The reaction product mixture was cooled and filtered to remove aniline hydrochloride, and the filtrate concentrated to dryness. The solid residue was recrystallized from ethyl ether to yield a yellow crystalline product weighing 2 g. and having a melting point of about 140°–144°C. The product was identified as 5-(α,α-diphenyl-α-anilinomethyl)pyrimidine by N.M.R. spectrum.

EXAMPLE 8

5-(α-Ethoxydiphenylmethyl)pyrimidine

A mixture of 10 g. of 5-(α-chlorodiphenylmethyl)-pyrimidine and a saturated solution of liquid ammonia in absolute alcohol was prepared and an exothermic reaction took place. When the exothermic reaction had subsided, the reaction product mixture was filtered and the filtrate evaporated to dryness. The solid residue was extracted with chloroform and the chloroform solution allowed to stand overnight at ambient room temperature. The crude crystals which separated were dissolved in ehtyl acetate and chromatographed over alumina using a mixture of hexane and ehtyl acetate as eluting solvent. A solid having a melting point of about 95°–97°C. was obtained from the eluate and identified by N.M.R. spectrum and elemental analysis as 5-(α-ethoxydiphenylmethyl)pyrimidine.

EXAMPLE 9

5-(α-Aminodiphenylmethyl)pyrimidine

A mixture of 12 g. of 5-(α-chlorodiphenylmethyl)-pyrimidine and an excess of liquid ammonia was heated at a temperature of about 100°C for about 2 hours in a closed stainless steel high-pressure reaction vessel. The reaction product was removed from the reaction vessel, the excess ammonia allowed to evaporate, and the residue extracted with benzene. The benzene solution was concentrated to yield a crystalline product having a melting point of about 135°–137°C. The product was identified as 5-(α-aminodiphenylmethyl)-pyrimidine by N.M.R. spectrum and elemental analysis.

EXAMPLE 10

5-[α-(2-Imidazolylthio)diphenylmethyl]pyrimidine

The potassium salt of 2-mercaptoimidazole was prepared by adding 10 g. of 2-mercaptoimidazole to an ethanol solution of potassium ethoxide prepared from 1 g. of potassium and 200 ml. of absolute ethanol. To the above mixture were added 5 g. of 5-(α-chlorodiphenylmethyl)pyrimidine and the reaction mixture heated to refluxing for about 2 hours. The reaction product mixture was concentrated in vacuo to dryness and the residue extracted with hot benzene. The benzene extract was cooled, and a solid product crystallized therefrom, weighing 3 g. and having a melting point of about 165°–167°C. It was identified as 5-[α-(2-imidazolylthio)diphenylmethyl]pyrimidine by elemental analysis and N.M.R. spectrum.

EXAMPLE 11

5-(α-Phenylphenethyl)pyrimidine

To sodamide in liquid ammonia prepared by the addition of 1.2 g. (0.05 g.-atom) of sodium to 500 ml. of liquid ammonia, were added 8.3 g. (0.05 mole) of 5-benzylpyrimidine, and the resulting red-brown mixture was sitrred for about 10 to 15 minutes. A solution of 6.3 g. (0.05 mole) of benzyl chloride in 15 ml. anhydrous ether was added and the reaction mixture stirred about one hour. To the reaction product mixture were added 200 ml. of ether and the mixture was evaporated to near dryness on the steam bath. The residue was slurried again with 200 ml. of ether and evaporated to dryness. The dry residue was dissolved in a mixture of about 500 ml. of ether and 200 ml. of water and the ether layer separated and dried over anhydrous magnesium sulfate. The drying agent was filtered off, and from the ether solution a solid precipitated. The solid, on standing, became an oil, which was dissolved in benzene and chromatographed on an alumina column, elution being carried out with a mixture of ethyl acetate and benzene. From the eluate a solid product was obtained which, upon recrystallization from petroleum ether, had a melting point of about 80°–82°C. The crystalline product weighed about 5 g. and was identified as 5-(α-phenylphenethyl)pyrimidine by elemental analysis and N.M.R. spectrum.

EXAMPLE 12

α-(4-Fluorophenyl)-α-phenyl-5-pyrimidinemethanol

To 300 ml. of anhydrous ether maintained in an atmosphere of dry nitrogen gas in a suitably equipped 3-neck round-bottom reaction flask cooled to −118°C. by an alcohol-liquid nitrogen cooling bath, were added 170 ml. (0.3 mole) of a 15 percent solution of butyllithium in hexane. Cooling and stirring in the dry nitrogen atmosphere were continued while a solution of 0.3 mole of 5-bromopyrimidine in 150 ml. of dry tetrahydrofuran was added and the whole stirred for about 2 hours. The temperature of the reaction mixture was lowered to −125°C. and a solution of 0.3 mole of 4-fluorobenzophenone in 150 ml. of dry tetrahydrofuran was added slowly while maintaining the temperature of the mixture at about −120°C. The reaction product mixture was stirred overnight and warmed to ambient room temperature. The reaction product mixture was neutralized by the addition of a saturated aqueous solution of ammonium chloride. The neutralized mixture was extracted with ether and the combined ether extracts dried over anhydrous potassium carbonate, filtered, and concentrated to dryness in vacuo and the residue dissolved in benzene. The benzene solution was chromatographed over 1500 g. of silica gel, elution being accomplished with an ethyl acetate-benzene mixture, using a gradient elution technique. The fraction obtained using a solvent containing 30:50 ethyl acetate-benzene was concnetrated to dryness at reduced pressure, yielding 52 g. of product having a melting point of about 112°–114°C. after recrystallization from ether. The product was identified by elemental analyses and N.M.R. spectrum as α-(4-fluorophenyl)-α-phenyl-5-pyrimidinemethanol.

We have found that our 5-substituted pyrimidines effectively inhibit the internodal growth of both terrestrial and aquatic plants. When terrestrial plants are to be treated, the compounds should be applied at rates in the range of about 0.1 to about 10 pounds per acre. The best rates for treating aquatic plants range from about 0.1 to about 10 parts per million parts by weight of water in which the aquatic plants grow. Larger amounts can at times be used, but are not economically attractive. The exact amount of compound to be used will vary somewhat depending upon the activity of the particular compound being used and the sensitivity of the particular plant being treated. In general, plants grown outdoors are much less sensitive than greenhouse-grown plants.

The types of plants that we have found to be affected in this manner by our compound include crop plants, ornamental plants, woody plants, aquatic weeds, and turf. Specific examples of these types of plants include cucumber, soybean, chrysanthemum, wheat, oats, barley, corn, rye, flax, cabomba, privet, rice, cotton, tobacco, tomato, hydrilla, Southern naiad, Eurasian watermilfoil and bluegrass. Although it has not been conclusively proved, it appears that the production of blossoms and fruit is sometimes increased with the decrease in foliar growth.

When terrestrial plants are treated with our compounds, root applications have resulted in the greatest activity. However, other methods of application, such as foliar spray or seed treatment can be used with some degree of success. When aquatic weeds are treated, the compounds are applied to and dissolved or suspended in the water in which the weeds grow; it is not known whether such plants absorb the compounds through the roots, foliage, or both. For application, our compounds are formulated into drenches, spray concentrates, wettable powders, granules, dusts, etc., in accordance with procedures known in the art.

For any such uses the compounds are formulated into compositions desirably containing, in addition to the 5-substituted pyrimidine, one or more of a plurality of additaments including water, polyhydroxy compounds, petroleum distillates, and other dispersion media, surface-active dispersing agents, emulsifiers, and finely-divided or granular inert solids. The concentration of the 5-substituted pyrimidine compound in these compositions may vary depending on whether the composition is intended as an emulsifiable concentrate or a wettable powder designed to be subsequently diluted with additional inert carrier such as water to produce the ultimate treating composition or is intended for direct application as a dust or granule to plants or their growth medium.

The following examples will illustrate the growth-inhibiting activity of our compounds.

EXAMPLE 13

α-Cyclopropyl-α-(4-methoxyphenyl)-5-pyrimidinemethanol was applied to Amsoy soybeans, Yellow Delaware chrysanthemums, and Kentucky bluegrass by both foliar spray and soil drench at three rates for each mode of application. Untreated control plants of each variety were also employed. The growth of the treated plants was compared to the controls and the degree of inhibition noted by a numbering system having the following meaning.

+3 = Distinct promotion
+2 = Moderate promotion
+1 = Slight promotion
0 = No effect
−1 = Slight inhibition
−2 = Moderate inhibition
−3 = Severe inhibition The average results from the two sets of treated plants are reported in the following table.

| Rate, lb./A. | Spray | | | Drench | | |
|---|---|---|---|---|---|---|
| | Soybean | Mum | Bluegrass | Soybean | Mum | Bluegrass |
| 0.4 | −2 | −2.5 | −0.5 | −1 | −3 | −0.5 |
| 2.0 | −2.5 | −3 | −2.5 | −2 | −3 | −2.5 |
| 10.0 | −3 | −3 | −3 | −3 | −3 | −3 |

EXAMPLE 14

A procedure similar to that described in Example 13 was used in testing the activity of a number of compounds against Harosoy soybeans, Yellow Delaware chrysanthemums and Kentucky bluegrass. The results are reported in the following table. Not every compound was tested against each plant at each rate of application.

| Compound | Rate, lb./A. | Spray | | | Drench | | |
|---|---|---|---|---|---|---|---|
| | | Soybean | Mum | Bluegrass | Soybean | Mum | Bluegrass |
| α-Cyclobutyl-α-phenyl-5-pyrimidinemethanol | 0.25 | −0.3 | −0.7 | −1.3 | −2 | −1 | −0.7 |
| | 0.5 | −1 | −2 | −1 | −3 | −1.7 | −0.7 |
| | 0.75 | −2 | −2 | −1 | −2.7 | −2 | −1 |
| | 2.0 | −3 | −2.7 | −1.3 | −3 | −3 | −1.7 |
| | 3.0 | −3 | −2.7 | −2 | −3 | −3 | −1.7 |
| | 5.0 | −3 | −2.7 | −2.7 | −3 | −3 | −3 |
| α-Cyclopropyl-α-(4-methoxyphenyl)-5-pyrimidinemethanol | 0.25 | −1 | −2.7 | −0.7 | −2.7 | −2.3 | −0.7 |
| | 0.5 | −1 | −2.7 | −0.7 | −2.7 | −3 | −1 |
| | 0.75 | −1.7 | −3 | −1 | −3 | −3 | −1.3 |
| | 2.0 | −2.7 | −2.7 | −1.7 | −2.7 | −2.7 | −1 |
| | 3.0 | −2.7 | −3 | −2.3 | −3 | −3 | −2.3 |
| | 5.0 | −3 | −3 | −3 | −3 | −2.7 | −3 |
| α-Cyclopentyl-α-phenyl-5-pyrimidinemethanol | 0.25 | −1.5 | 0 | −0.5 | 0 | −1.5 | −1 |
| | 0.5 | −2.5 | −1.5 | −1 | 0 | −1 | −0.5 |
| | 0.75 | −3 | −1.5 | −1.5 | 0 | −1 | −0.5 |
| α-(2-Chloro-4-methoxyphenyl)-α-phenyl-5-pyrimidinemethanol | 0.4 | 0 | 0 | 0 | 0 | 0 | 0 |
| | 2 | 0 | 0 | 0 | 0 | 0 | −1 |
| | 10 | 0 | 0 | −1 | 0 | 0 | −3 |

—Continued

| Compound | Rate. lb./A. | Spray | | | Drench | | |
|---|---|---|---|---|---|---|---|
| | | Soybean | Mum | Bluegrass | Soybean | Mum | Bluegrass |
| α,α-Bis(n-octyl)-5-pyrimidine-methanol | 0.4 | −3 | −1 | 0 | −1 | 0 | 0 |
| | 2 | 0 | 0 | 0 | 0 | 0 | 0 |
| | 10 | −2 | 0 | 0 | −2 | 0 | 0 |
| α,α-Bis(4-chlorophenyl)-5-pyrimidine-methanol | 0.4 | 0 | — | −1 | −1 | — | −2 |
| | 2 | 0 | — | 0 | −1 | — | −1 |
| | 10 | 0 | — | −1 | −1 | — | −2 |
| α-(3-Cyclohexenyl)-2-(3,4-methylenedioxyphenyl)-5-pyrimidine-methanol | 0.4 | 0 | −1 | 0 | 0 | 0 | −1 |
| | 2 | 0 | −1 | 0 | 0 | 0 | −2 |
| | 10 | 0 | −3 | −3 | −1 | −1 | −3 |
| α-Cyclohexyl-α-(m-tolyl)-5-pyrimidine-methanol | 0.4 | 0 | 0 | −1 | 0 | 0 | 0 |
| | 2 | 0 | 0 | −2 | 0 | 0 | −2 |
| | 10 | 0 | −1 | −3 | 0 | 0 | −3 |
| α-Cyclopropyl-α-(2,4-xylyl)-5-pyrimidine-methanol | 0.4 | 0 | 0 | 0 | 0 | 0 | 0 |
| | 2 | 0 | −2 | 0 | −3 | −2 | 0 |
| | 10 | 0 | −2 | — | −3 | −3 | −2 |
| α-Cyclohexyl-α-cyclohexylmethyl-5-pyrimidine-methanol | 0.4 | 0 | 0 | 0 | 0 | 0 | −1 |
| | 2 | 0 | 0 | 0 | 0 | 0 | −2 |
| | 10 | 0 | 0 | −1 | −1 | 0 | −3 |
| 5-(α-phenylphenethyl)-pyrimidine | 0.4 | 0 | — | 0 | 0 | — | 0 |
| | 2 | −2 | — | 0 | 0 | — | −1 |
| | 10 | −2 | — | −2 | 0 | — | −2 |
| α-Phenyl-α-(2-thienyl)-5-pyrimidine-methanol | 0.4 | −1 | — | 0 | +1 | — | 0 |
| | 2 | 0 | — | 0 | 0 | — | −1 |
| | 10 | −2 | — | −2 | −2 | — | −3 |
| α-(2-Fluorophenyl)-α-phenyl-5-pyrimidine-methanol | 0.4 | −1 | — | 0 | −2 | — | −1 |
| | 2 | +1 | — | −1 | −1 | — | −2 |
| | 10 | 0 | — | −3 | −2 | — | −3 |
| α-Isobutyl-α-isopropyl-5-pyrimidine-methanol | 0.4 | 0 | −1 | 0 | −2 | 0 | 0 |
| | 2 | −3 | −1 | 0 | — | −2 | 0 |
| | 10 | −3 | −1 | 0 | — | −2 | −3 |
| 9-(5-Pyrimidinyl)-xanthen-9-ol | 0.4 | 0 | — | 0 | 0 | — | — |
| | 2 | −2 | — | −2 | 0 | — | −3 |
| | 10 | −3 | — | −3 | −1 | — | −3 |
| 5-Benzhydryl-pyrimidine | 0.4 | 0 | — | −1 | 0 | — | 0 |
| | 2 | 0 | — | 0 | 0 | — | 0 |
| | 10 | 0 | — | −3 | 0 | — | −2 |
| 5-(α-Ethoxydiphenylmethyl)-pyrimidine | 0.4 | +1 | — | −1 | 0 | — | −1 |
| | 2 | +2 | — | −2 | 0 | — | −3 |
| | 10 | −3 | — | −3 | 0 | — | −3 |
| 9-(5-Pyrimidinyl)fluoren-9-ol | 0.4 | −1 | — | −1 | 0 | — | −1 |
| | 2 | 0 | — | −2 | 0 | — | −3 |
| | 10 | −1 | — | −3 | −2 | — | −3 |
| α-(3-Fluorophenyl)-α-phenyl-5-pyrimidine-methanol | 0.4 | −2 | 0 | 0 | 0 | 0 | 0 |
| | 2 | 0 | 0 | 0 | −2 | 0 | −1 |
| | 10 | −2 | −1 | 0 | −2 | −2 | −2 |

EXAMPLE 15

A number of plants were treated with liquid formulations containing various concentrations of α-cyclopropyl-α-(4-methoxyphenyl)-5-pyrimidinemethanol applied at the rates indicated. Application either by foliar spray or soil drench was used. The results are given in terms of percent inhibition as compared to untreated controls.

| Plant | Conc., p.p.m. | Rate, lb./A. | % Inhibition |
|---|---|---|---|
| Harosoy | 62.5 | 0.12 | 2.7 |
| soybeans | 125 | 0.23 | 15 |
| (foliar) | 250 | 0.46 | 31 |
|  | 500 | 0.92 | 52 |
|  | 1000 | 1.85 | 68 |
| Cucumber | 62.5 | 0.12 | 53.9 |
| (foliar) | 125 | 0.23 | 53.9 |
|  | 250 | 0.46 | 63.3 |
|  | 500 | 0.92 | 62.8 |
|  | 1000 | 1.85 | 67.4 |
| Privet | 62.5 | 0.15 | 32.0 |
| (soil) | 125 | 0.30 | 11.7 |
|  | 250 | 0.61 | 57.0 |
|  | 500 | 1.22 | 63.3 |
|  | 1000 | 2.44 | 82.8 |
| Chrysanthemum | 62.5 | 0.06 | 8.4 |
| (foliar | 62.5 | 0.12 | 13.1 |
|  | 62.5 | 0.25 | 30.8 |
|  | 125 | 0.12 | 27.1 |
|  | 125 | 0.25 | 30.8 |
|  | 125 | 0.5 | 49.5 |
|  | 250 | 0.25 | 38.3 |
|  | 250 | 0.5 | 51.4 |
|  | 250 | 1.0 | 60.7 |
|  | 500 | 0.5 | 65.0 |
|  | 500 | 1.0 | 63.1 |
|  | 500 | 2.0 | 72.0 |
| Wheat | 62.5 | 0.12 | 0 |
| (foliar) | 125 | 0.23 | 0 |
|  | 250 | 0.46 | 9.4 |
|  | 500 | 0.92 | 28.1 |
|  | 1000 | 1.85 | 40.6 |
| Barley | 62.5 | 0.12 | 0 |
| (foliar) | 125 | 0.23 | 0 |
|  | 250 | 0.46 | 0 |
|  | 500 | 0.92 | 0 |
|  | 1000 | 1.85 | 31.6 |
| Rye | 62.5 | 0.12 | 0 |
| (foliar) | 125 | 0.23 | 12.1 |
|  | 250 | 0.46 | 15.1 |
|  | 500 | 0.92 | 18.1 |
|  | 1000 | 1.85 | 42.4 |

EXAMPLE 16

The activity of representative compounds against a typical common aquatic weed, *Hydrilla verticillata*, was evaluated in tests conducted as follows.

A nutrient solution containing the following compounds was first prepared.

|  | mg./l. |
|---|---|
| $KH_2PO_4$ | 362 |
| $KNO_3$ | 269 |
| $Ca(NO_3)_2$ | 438 |
| $MgSO_4$ | 321 |
| $H_3BO_3$ | 0.382 |
| $MnCL_2.4H_2O$ | 0.242 |
| $CuSO_4.5H_2O$ | 0.011 |
| $H_2MoO_4.H_2O$ | 0.003 |
| zinc acetate | 0.022 |
| $NaHCO_3$ | 64.2 |
| Fe (as an ethylenediaminetetraacetic acid chelate) | 2 |
| Deionized water |  |

Each compound to be tested was added at the rate of 10 parts per million parts of water by weight to two 750 ml. polystyrene growth containers of nutrient solution. Each compound was formulated by dissolving 20 mg. of the compound in 1 ml. of acetone and 9 ml. of 0.1% polyoxyethylene sorbitan monooleate solution. A 3.75 ml. portion of the formulation was added to each 750 ml. portion of nutrient solution containing a 4 inch terminal hydrilla cutting.

Additional control cuttings were grown in identical growth containers to which a blank formulation without a test compound was added.

All the cuttings were allowed to grow for 3 weeks under fluorescent light, and then were measured. The lengths of the replicate cuttings were averaged. The percent inhibition produced by each test compounnd was determined by dividing the average increase in length by the average increase in length of the control cuttings.

Results obtained from testing typical compounds were as follows.

| Compound | % Inhibition |
|---|---|
| 5-(α-aminodiphenylmethyl)-pyrimidine | 100 |
| α-(4-chlorophenyl)-α-(norbornan-2-yl)-5-pyrimidinemethanol | 100 |
| α-cyclohexyl-α-(3-cyclohexylpropyl)-5-pyrimidinemethanol | 100 |
| α-(3,4-dimethoxyphenyl)-α-(3,4,5-trimethoxyphenyl)-5-pyrimidinemethanol | 62.2 |
| α-(1-adamantyl)-α-(4-methoxyphenyl)-5-pyrimidinemethanol | 95.6 |
| α,α-bis(2-methylpropenyl)-5-pyrimidinemethanol | 98 |
| α-cyclopropyl-α-(2-thienyl)-5-pyrimidinemethanol | 100 |
| 5-(α,α-diphenyl-α-anilinomethyl)pyrimidine | 99.8 |
| 5-[α-(2-imidazolylthio)diphenylmethyl]pyrimidine | 99.3 |
| 5-(α-ethoxydiphenylmethyl)-pyrimidine | 100 |
| 1-(5-pyrimidinyl)-1-tetralol | 100 |
| α-isopropyl-α-(4-methylsulfonylphenyl)-5-pyrimidinemethanol | 65.6 |
| α-(3-fluorophenyl)-α-(4-fluorophenyl)-5-pyrimidinemethanol | 99.6 |
| α-cyclohexyl-α-(2-methoxyphenyl)-5-pyrimidinemethanol | 100 |
| α-(4-chlorophenyl)-α-isopropyl-5-pyrimidinemethanol | 100 |
| α-(2,4-dimethoxyphenyl)-α-ethyl-5-pyrimidinemethanol | 99.2 |
| 5-[α-(p-chlorophenoxy)-p-methoxybenzyl]pyrimidine | 100 |
| α-cyclohexyl-α-(4-phenoxybutyl)-5-pyrimidinemethanol | 100 |
| α,α-bis(n-nonyl)-5-pyrimidinemethanol | 99.3 |
| α-cyclohexylmethyl-α-isopropyl-5-pyrimidinemethanol | 97.6 |

We claim:

1. A method of inhibiting the intermodal growth of plants which comprises contacting the plants with an effective amount of a compound of the formula

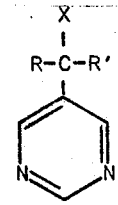

wherein

X is hydrogen, hydroxy, N(R'')$_2$, C$_1$–C$_3$ alkoxy, halo, cyano, anilino, or imidazolylthio; R is C$_2$–C$_{11}$ alkyl, C$_2$–C$_{11}$ alkenyl,

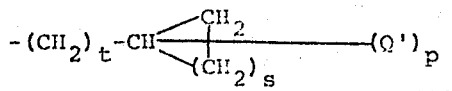

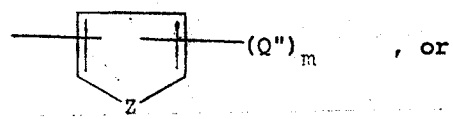

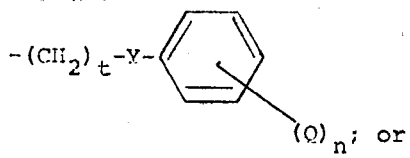

R' is C$_3$–C$_{11}$ alkyl, C$_2$–C$_{11}$ alkenyl, norbornen-2-yl, 2-norbornyl, adamantyl,

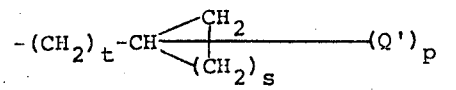

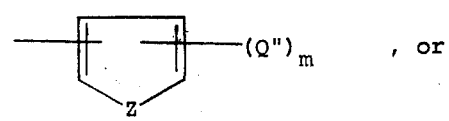

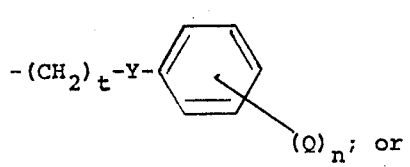

when

X is hydrogen or hydroxy, R and R' taken together with the carbon atom to which they are attached form a ring of the fomula

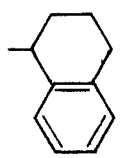

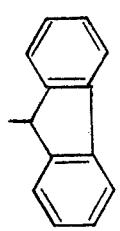

, or

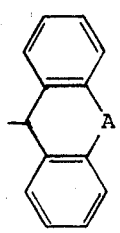

;

Q is C$_1$–C$_4$ alkyl, C$_1$–C$_4$ alkoxy, C$_1$–C$_4$ alkylthio, halo, hydroxy, trifluoromethyl, C$_1$–C$_4$ alkylsulfonyl, nitro, or di(C$_1$–C$_4$ alkyl)amino, or two Q's attached to adjacent carbon atoms of a benzene ring form a methylenedioxy group;

Q' is C$_1$–C$_4$ alkyl or methoxy;
Q'' is C$_1$–C$_4$ alkyl;
Y is oxygen, sulfur, or a carbon to carbon bond;
Z is oxygen or sulfur;
A is oxygen, sulfur, CH$_2$, or CH$_2$–CH$_2$;
R'' is hydrogen or C$_1$–C$_4$ alkyl;
$n$ is 0 to 5;
$m$ is 0 to 2;
$p$ is 0 to 3;
$s$ is 1 to 6; and
$t$ is 0 to 5, and the nonphytotoxic acid addition salts thereof.

2. The method of claim 1 wherein the compound is α,α-bis(n-nonyl)-5-pyrimidinemethanol.

3. The method of claim 1 wherein the compound is 5-(α-isopropyl-4-methoxybenzyl)pyrimidine.

4. A method of claim 1 wherein growth is regulated by a compound wherein X is hydroxy, R' is C$_3$–C$_8$ cycloaklyl, and R is C$_2$–C$_{11}$ alkyl.

5. The method of claim 4 wherein the compound is α-cyclohexyl-α-isopropyl-5-pyrimidinemethanol.

6. A method of claim 1 wherein growth is regulated by a compound wherein X is hydroxy, R is C$_3$–C$_8$ cycloalkyl, and R' is C$_3$–C$_8$ cycloalkyl.

7. The method of claim 6 wherein the compound is α-cyclohexyl-α-cyclopropyl-5-pyrimidinemethanol.

8. A method of claim 1 wherein growth is regulated by a compound wherein X is hydroxy, R is C$_3$–C$_8$ cycloalkyl, and R' is phenyl, optionally substituted with C$_1$–C$_4$ alkyl, C$_1$–C$_4$ alkoxy, or halo.

9. the method of claim 8 wherein the compound is α-cyclopropyl-α-(4-methoxyphenyl)-5-pyrimidinemethanol.

10. The method of claim 8 wherein the compound is α-cyclopropyl-α-(p-cumenyl)-5-pyrimidinemethanol.

11. The method of claim 8 wherein the compound is α-cyclopropyl-α-(p-tolyl)-5-pyrimidinemethanol.

12. The method of claim 8 wherein the compound is α-(4-bromophenyl)-α-cyclopropyl-5-pyrimidinemethanol.

13. The method of claim 8 wherein the compound is α-cyclopropyl-α-(4-fluorophenyl)-5-pyrimidinemethanol.

14. The method of claim 8 wherein the compound is α-cyclobutyl-α-(4-methoxyphenyl)-5-pyrimidinemethanol.

15. The method of claim 8 wherein the compound is α-(4-chlorophenyl)-α-cyclopropyl-5-pyrimidinemethanol.

16. A method of claim 1 wherein growth is regulated by a compound wherein X is hydroxy, R' is phenyl, optionally substituted with C$_1$–C$_4$ alkyl, C$_1$–C$_4$ alkoxy, halo, or trifluoromethyl, and R is C$_2$–C$_{11}$ alkyl.

17. The method of claim 16 wherein the compound is α-(α,α,α-trifluoro-m-tolyl)-α-isopropyl-5-pyrimidinemethanol.

18. The method of claim 16 wherein the compound is α-(α,α,α-trifluoro-p-tolyl)-α-isopropyl-5-pyrimidinemethanol.

19. The method of claim 16 wherein the compound is α-(4-ethoxyphenyl)-α-isopropyl-5-pyrimidinemethanol.

20. The method of claim 16 wherein the compound is α-(4-chlorophenyl)-α-isopropyl-5-pyrimidinemethanol.

21. The method of claim 16 wherein the compound is α-(t-butyl)-α-(4-methoxyphenyl)-5-pyrimidinemethanol.

22. The method of claim 16 wherein the compound is α-(p-cumenyl)-α-isopropyl-5-pyrimidinemethanol.

23. The method of claim 16 wherein the compound is α-(3,4-dichlorophenyl)-α-isopropyl-5-pyrimidinemethanol.

24. The method of claim 16 wherein the compound is α-(3-chlorophenyl)-α-isopropyl-5-pyrimidinemethanol.

25. The method of claim 16 wherein the compound is α-isopropyl-α-(4-propoxyphenyl)-5-pyrimidinemethanol.

26. The method of claim 16 wherein the compound is α-(t-butyl)-α-(p-tolyl)-5-pyrimidinemethanol.

27. The method of claim 16 wherein the compound is α-isopropyl-α-(4-methoxyphenyl)-5-pyrimidinemethanol.

28. A method of claim 1 wherein growth is regulated by a compound wherein X is hydroxy, R is phenyl, optionally substituted with $C_1$–$C_4$ alkyl, $C_1$–$C_4$ alkoxy, halo, or trifluoromethyl, and R' is phenyl, optionally substituted with $C_1$–$C_4$ alkyl, $C_1$–$C_4$ alkoxy, or halo.

29. The method of claim 28 wherein the compound is α-(2-fluorophenyl)-α-(4-fluorophenyl)-5-pyrimidinemethanol.

* * * * *

UNITED STATES PATENT OFFICE
CERTIFICATE OF CORRECTION

PATENT NO. : 3,868,244
DATED : February 25, 1975
INVENTOR(S) : Harold M. Taylor et al.

It is certified that error appears in the above-identified patent and that said Letters Patent are hereby corrected as shown below:

Column 4, line 11, "out" should read --- our ---.

Column 5, line 34, "soltuion" should read --- solution ---.

Column 6, line 1, "5-(α,60-diphenyl" should read --- 5-(α,α-diphenyl ---.

Column 6, line 61, "pyrimidinemethaol." should read ---pyrimidine-methanol. ---.

Column 7, line 7, "α-(4methoxyphenyl)" should read --- α-(4-methoxyphenyl) ---.

Column 7, line 9, "α-(p-Cumenyl)α-isopropyl" should read --- α-(p-Cumenyl)-α-isopropyl ---.

Column 7, line 16, "pyrimidinementhanol" should read --- pyrimidinemethanol ---.

Column 7, line 26, "α-(2Chlorophenyl)" should read --- α-(2-Chlorophenyl) ---.

Column 7, line 37, "140°-150°C." should read --- 149°-150°C. ---.

Column 8, line 17, "n-butly" should read --- n-butyl ---.

Column 8, line 29, "(4-Phenoxybutly)" should read --- (4-Phenoxybutyl) ---.

Column 8, line 50, "layer" should read --- layers ---.

UNITED STATES PATENT OFFICE
CERTIFICATE OF CORRECTION

Page 2

PATENT NO. : 3,868,244
DATED : February 25, 1975
INVENTOR(S) : Harold M. Taylor et al.

It is certified that error appears in the above-identified patent and that said Letters Patent are hereby corrected as shown below:

Column 9, line 54, "of" should read --- on ---.

Column 10, line 35, "5-(1-phenyl" should read --- 5-(1-Phenyl ---.

Column 10, line 46, "ethyl either" should read --- ethyl ether ---

Column 12, line 42, "concnetrated" should read --- concentrated ---.

Column 12, line 64, "compound" should read --- compounds ---.

Column 15, compound 7, "51(α-phenyl-" should read --- 5-(α-phenyl- ---.

Column 17, line 28, "(foliar" should read --- (foliar) ---.

Column 19, drawing at line 5 should be followed by --- , or ---.

Column 19, the drawing appearing at line 10 should be deleted, together with the phrase ", or" following the drawing.

Column 19, delete the word "or" immediately following the drawing between lines 15 and 20.

Column 20, line 25, "cloaklyl" should read --- cloalkyl ---.

Signed and Sealed this fourteenth Day of October 1975

[SEAL]

Attest:

RUTH C. MASON
Attesting Officer

C. MARSHALL DANN
Commissioner of Patents and Trademarks